United States Patent [19]
Christian et al.

[11] Patent Number: 6,060,230
[45] Date of Patent: May 9, 2000

[54] IMAGING ELEMENT COMPRISING AN ELECTRICALLY-CONDUCTIVE LAYER CONTAINING METAL-CONTAINING PARTICLES AND CLAY PARTICLES AND A TRANSPARENT MAGNETIC RECORDING LAYER

[75] Inventors: Paul A. Christian, Norton, Mass.; Dennis J. Eichorst, Fairport; Debasis Majumdar, Rochester, both of N.Y.

[73] Assignee: Eastman Kodak Company, Rochester, N.Y.

[21] Appl. No.: 09/215,725

[22] Filed: Dec. 18, 1998

[51] Int. Cl.$^7$ ........................................ G03C 1/89
[52] U.S. Cl. ............................. 430/530; 430/527
[58] Field of Search ................... 430/527, 530

[56] References Cited

U.S. PATENT DOCUMENTS

| | | |
|---|---|---|
| 3,782,947 | 1/1974 | Krall . |
| 4,173,480 | 11/1979 | Woodward ........................ 430/536 |
| 4,275,103 | 6/1981 | Tsubusaki et al. . |
| 4,279,945 | 7/1981 | Audran et al. . |
| 4,302,524 | 11/1981 | Mandella et al. . |
| 4,394,441 | 7/1983 | Kawaguchi et al. . |
| 4,416,963 | 11/1983 | Takimoto et al. . |
| 4,418,141 | 11/1983 | Kawaguchi et al. . |
| 4,431,764 | 2/1984 | Yoshizumi . |
| 4,495,276 | 1/1985 | Takimoto et al. . |
| 4,571,361 | 2/1986 | Kawaguchi et al. . |
| 4,990,276 | 2/1991 | Bishop et al. . |
| 4,999,276 | 3/1991 | Kuwabara et al. . |
| 5,122,445 | 6/1992 | Ishigaki . |
| 5,147,768 | 9/1992 | Sakakibara . |
| 5,215,874 | 6/1993 | Sakakibara . |
| 5,217,804 | 6/1993 | James et al. ........................ 430/496 |
| 5,229,259 | 7/1993 | Yokota . |
| 5,252,441 | 10/1993 | James et al. . |
| 5,254,449 | 10/1993 | James et al. . |
| 5,294,525 | 3/1994 | Yamauchi et al. ................. 430/530 |
| 5,336,589 | 8/1994 | Mukunoki et al. . |
| 5,340,676 | 8/1994 | Anderson et al. .................. 430/530 |
| 5,368,995 | 11/1994 | Christian et al. ................... 430/530 |
| 5,382,494 | 1/1995 | Kudo et al. . |
| 5,395,743 | 3/1995 | Brick et al. . |
| 5,413,900 | 5/1995 | Yokota . |
| 5,427,900 | 6/1995 | James et al. ........................ 430/496 |
| 5,457,013 | 10/1995 | Christian et al. ................... 430/496 |
| 5,459,021 | 10/1995 | Ito et al. ............................. 430/527 |
| 5,466,567 | 11/1995 | Anderson et al. .................. 430/530 |
| 5,478,709 | 12/1995 | Vandenabeele .................... 430/527 |
| 5,484,694 | 1/1996 | Lelental et al. .................... 430/530 |
| 5,498,512 | 3/1996 | James et al. ........................ 430/496 |
| 5,552,469 | 9/1996 | Beall et al. ......................... 524/445 |
| 5,554,670 | 9/1996 | Giannelis et al. .................. 523/574 |
| 5,700,623 | 12/1997 | Anderson et al. .................. 430/256 |
| 5,707,791 | 1/1998 | Ito et al. . |
| 5,827,630 | 10/1998 | Eichorst et al. .................... 430/527 |
| 5,866,287 | 2/1999 | Christian et al. ................... 430/527 |
| 5,869,217 | 2/1999 | Aono ................................. 430/527 |
| 5,869,227 | 2/1999 | Majumdar et al. ................. 430/527 |
| 5,891,611 | 4/1999 | Majumdar et al. ................. 430/527 |
| 5,981,126 | 11/1999 | Majumdar et al. ................. 430/63 |

FOREIGN PATENT DOCUMENTS

| | | |
|---|---|---|
| 4055492 | 2/1992 | Japan . |
| 4062543 | 2/1992 | Japan . |
| 6161033 | 6/1994 | Japan . |
| 7168293 | 7/1995 | Japan . |

*Primary Examiner*—Richard L. Schilling
*Attorney, Agent, or Firm*—Carl F. Ruoff; Doreen M. Wells

[57] ABSTRACT

The present invention is an imaging element which includes a support, an image-forming layer superposed on said support, a transparent magnetic recording layer superposed on said support; and an electrically-conductive layer superposed on said support. The transparent magnetic recording layer is composed of magnetic particles dispersed in a first film-forming polymeric binder. The electrically-conductive layer includes electrically-conductive metal-containing colloidal particles, swellable, smectite clay particles, a first polymeric binder which can sufficiently intercalate inside or exfoliate the smectite clay particles and a second film-forming polymeric binder, wherein the electrically-conductive metal-containing particles and the polymer-intercalated or polymer-exfoliated smectite clay particles are dispersed.

20 Claims, 1 Drawing Sheet

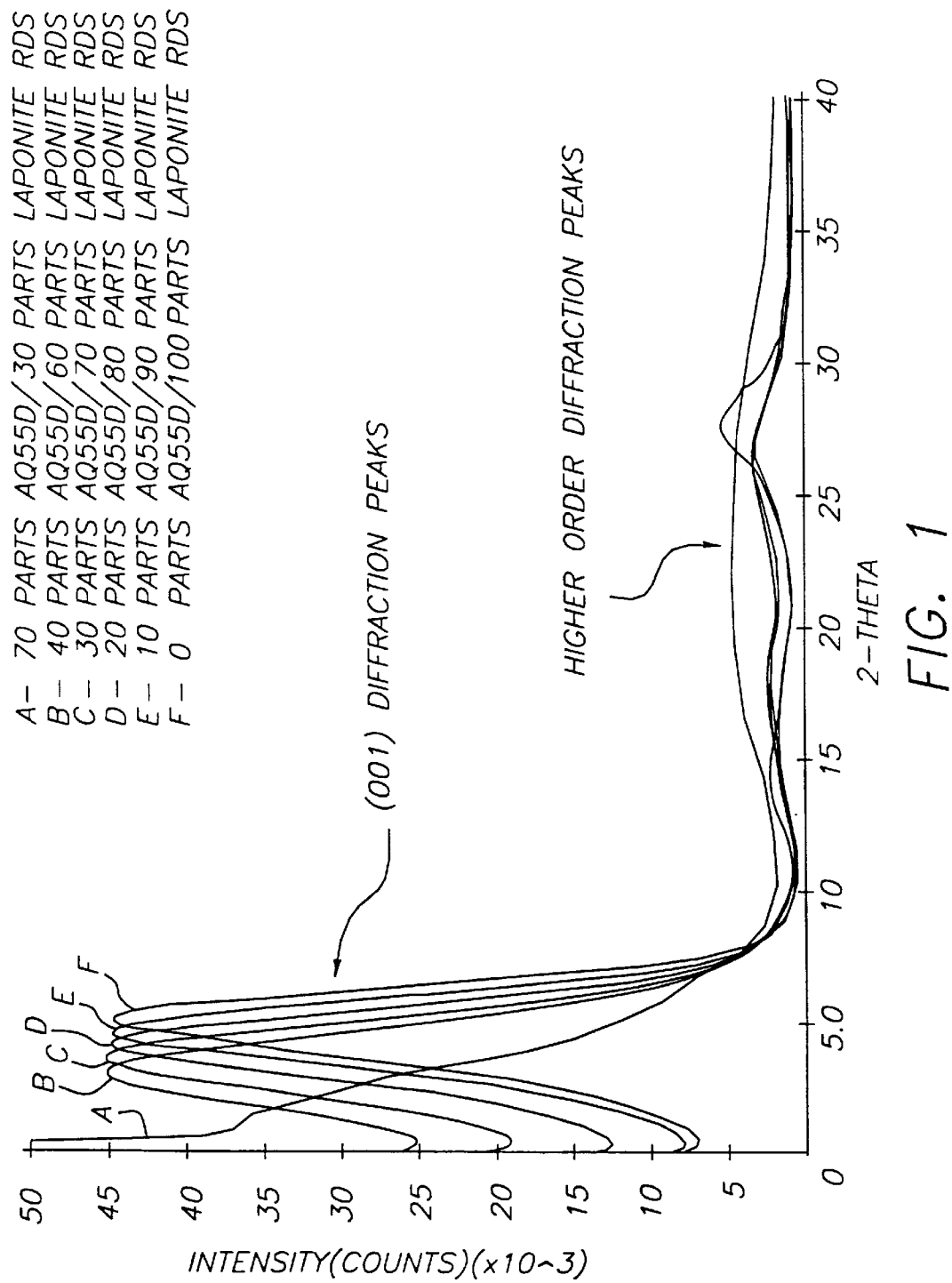

IMAGING ELEMENT COMPRISING AN ELECTRICALLY-CONDUCTIVE LAYER CONTAINING METAL-CONTAINING PARTICLES AND CLAY PARTICLES AND A TRANSPARENT MAGNETIC RECORDING LAYER

FIELD OF THE INVENTION

This invention relates generally to multilayer imaging elements and in particular, to multilayer imaging elements containing a support, at least one image-forming layer, at least one transparent electrically-conductive layer, and a transparent magnetic recording layer. More specifically, this invention relates to photographic and thermally-processable imaging elements containing at least one imaging layer, at least one electrically-conductive layer containing electrically-conductive metal-containing colloidal particles and polymer-intercalated or exfoliated smectite clay particles dispersed in a film-forming binder or mixture of film-forming binders applied to the side of the support opposite the imaging layer, and a transparent magnetic recording layer overlying the electrically-conductive layer.

BACKGROUND OF THE INVENTION

It is well known to include in various kinds of imaging elements, a transparent layer containing ferromagnetic particles dispersed in a polymeric binder. The inclusion and use of such transparent magnetic recording layers in light-sensitive silver halide photographic elements has been described in U.S. Pat. Nos. 3,782,947; 4,279,945; 4,302, 523; 4,990,276; 5,215,874; 5,217,804; 5,229,259; 5,252, 441; 5,254,449; 5,395,743; 5,413,900; 5,427,900; 5,498, 512; and others. Such elements are advantageous because images can be recorded by customary photographic processes while additional information can be recorded simultaneously into or read from the magnetic recording layer by techniques similar to those employed in traditional magnetic recording art.

Any transparent magnetic recording layer must be capable of accurate recording and playback of digitally encoded information repeatedly on demand by various devices such as cameras, photofinishing equipment or printing systems. The magnetic recording layer also must exhibit excellent runnability, durability (i.e., abrasion and scratch resistance), and magnetic head-cleaning properties without adversely affecting the imaging quality of the photographic element. However, this goal is difficult to achieve because of the nature and concentration of the magnetic particles required to provide sufficient signal to write and read magnetically stored data and the effect of any noticeable color, haze or grain associated with the magnetic layer on the optical density and granularity of the photographic imaging layers. These requirements are particularly difficult to meet when magnetically recorded information is stored and read from the photographic image area. Further, because of the curl of the photographic element, primarily due to the photographic emulsion layers and the core set of the support, the magnetic layer must be held more tightly against the magnetic heads than in conventional magnetic recording in order to maintain planarity at the head-media interface during recording and playback operations. Thus, all of these various requirements must be considered both independently and cumulatively in order to arrive at a commercially viable photographic element containing a transparent magnetic recording layer that will not have a detrimental effect on the photographic imaging performance and still withstand repeated and numerous read-write operations by a magnetic head.

Electrostatic charge can be generated during the use of an imaging element incorporating a transparent magnetic recording layer, such as photographic film. For example, in an automatic camera, because of the repeated motion of the photographic film in and out of the film cassette, electrostatic charge can be generated by the movement of the film across the magnetic heads and by the repeated winding and unwinding operations, especially in a low relative humidity environment. The accumulation of charge can result in the attraction and adhesion of dust to the film surface. The presence of dust can result in physical defects, the degradation of the image quality of the photographic element as well as the degradation of magnetic recording performance (e.g., decreased S/N ratio, "drop-outs", etc.). Degradation of magnetic recording performance can arise from various sources including signal loss caused by increased head-media spacing or clogging of the magnetic head gap, electrical noise from static discharge by the magnetic head during playback, uneven film transport across the magnetic heads, and excessive wear of the magnetic heads. In order to minimize problems caused by electrostatic charge during the manufacture and use of imaging elements incorporating a magnetic recording layer, an electrically-conductive antistatic layer can be incorporated into the imaging element in various ways to dissipate any accumulated static charge, for example, as a subbing layer, an intermediate layer, and especially as an outermost layer either overlying the imaging layer or as a backing layer on the opposite side of the support from the imaging layer(s). Typically, in photographic elements containing a transparent magnetic recording layer, the antistatic layer is located underlying the magnetic recording layer as a backing layer.

A wide variety of conductive antistatic agents can be incorporated in antistatic layers to produce a broad range of surface electrical conductivities. Many of the conventional antistatic layers used in photographic elements employ materials which exhibit predominantly ionic conductivity. Antistatic layers containing simple inorganic salts, alkali metal salts of surfactants, alkali metal ion-stabilized colloidal metal oxide sols, clay sols, ionic conductive polymers or polymeric electrolytes containing alkali metal salts and the like have been taught in prior art. The electrical conductivities of such ionic conductors are typically strongly dependent on the temperature and relative humidity of the surrounding environment. At low relative humidities and temperatures, the diffusional mobilities of the charge-carrying ions are greatly reduced and the bulk conductivity is substantially decreased. Further, at high relative humidities, an unprotected antistatic backing layer can absorb water, swell, and soften. Especially in the case of roll films, this can result in the adhesion (viz., ferrotyping) and even physical transfer of portions of a backing layer to a surface layer on the emulsion side of the film (viz., blocking). Because of the aqueous solubility and ion-exchange properties of such ionic conducting materials, unprotected antistatic layers containing these materials typically do not exhibit acceptable antistatic properties after photographic processing.

U.S. application Ser. No. 08/937,685 (filed Sep. 29, 1997) now U.S. Pat. 5,891,611, assigned to the same assignee as the present application and incorporated herein by reference discloses a polyolefin resin-coated photographic paper having a print-retaining antistatic backing layer containing an electrically-conducting swellable or smectite clay and a polymeric binder wherein the polymeric binder is capable of sufficiently intercalating inside or exfoliating the smectite clay. One particularly preferred type of swellable or smectite clay is a synthetic layered hydrous magnesium silicate resembling the natural clay mineral hectorite in both structure and chemical composition. Polymers capable of intercalating in such a clay are those which are sorbed between the silicate platelets of the clay particles so as to cause a separation or an increase in separation between adjacent silicate platelets. The extent of intercalation or exfoliation of the clay particles by the polymer can be conveniently monitored by measuring the basal (001) spacing of the clay platelets using an x-ray diffraction technique, as described by Gianellis et al. in U.S. Pat. No. 5,554,670. Typically, when intercalation occurs, an increase in the basal spacing of the clay is observed. When exfoliation occurs the diffraction peaks broaden so as to disappear altogether, since long-range crystallographic order is lost. Suitable polymers that provide conductive backing layers with desirable performance characteristics for photographic paper are disclosed in the '685 application and include water soluble polymers such as polyvinyl alcohols, polyethylene oxides, polyacrylamides, polystyrene sulfonates, water-insoluble polymers such as polymers of styrene, polymers of styrene derivatives, interpolymers of styrene, interpolymers of styrene derivatives, alkyl acrylates, alkyl methacrylates, derivatives of alkyl acrylates, derivatives of alkyl methacrylates, olefins, acrylonitriles, polyurethanes and polyester ionomers. Other suitable polymers that can sufficiently intercalate in or exfoliate smectite clays are disclosed in U.S. Pat. No. 5,552,469.

Antistatic layers containing electronic conductors such as conjugated conductive polymers, conductive carbon particles, crystalline semiconductor particles, amorphous semiconductive fibrils, and continuous semiconductive thin films can be used more effectively than ionic conductors to dissipate static charge since their electrical conductivity is independent of relative humidity and only slightly influenced by ambient temperature. Of the various types of electronic conductors, electrically-conductive metal-containing particles, such as semiconductive metal oxides, are particularly effective when dispersed with suitable polymeric film-forming binders in combination with polymeric non-film-forming particles as described in U.S. Pat. Nos. 5,340,676; 5,466,567; 5,700,623. Binary metal oxides doped with appropriate donor heteroatoms or containing oxygen deficiencies have been disclosed in prior art to be useful in antistatic layers for photographic elements, for example: U.S. Pat. Nos. 4,275,103; 4,416,963; 4,495,276; 4,394,441; 4,418,141; 4,431,764; 4,495,276; 4,571,361; 4,999,276; 5,122,445; 5,294,525; 5,382,494; 5,459,021; 5,484,694; and others. Suitable claimed conductive metal oxides include: zinc oxide, titania, tin oxide, alumina, indium oxide, silica, magnesia, zirconia, barium oxide, molybdenum trioxide, tungsten trioxide, and vanadium pentoxide. Preferred doped conductive metal oxide granular particles include Sb-doped tin oxide, F-doped tin oxide, Al-doped zinc oxide, and Nb-doped titania. Additional preferred conductive ternary metal oxides disclosed in U.S. Pat. No. 5,368,995 include zinc antimonate and indium antimonate. Other conductive metal-containing granular particles including metal borides, carbides, nitrides, and silicides have been disclosed in Japanese Kokai No. JP 04-055,492.

The use of such electrically-conductive layers containing suitable semiconductive metal oxide particles dispersed in a film-forming binder in combination with a transparent magnetic recording layer in silver halide imaging elements has been described in the following examples of the prior art. Photographic elements containing a transparent magnetic recording layer and a transparent electrically-conductive layer both located on the backside of the film base have been described in U.S. Pat. Nos. 5,147,768; 5,229,259; 5,294, 525; 5,336,589; 5,382,494; 5,413,900; 5,457,013; 5,459, 021; 5,707,791, and others. The conductive layers described in the cited patents contained fine granular particles of a semiconductive crystalline metal oxide such as zinc oxide, titania, tin oxide, alumina, indium oxide, silica, complex or compound oxides thereof, and zinc antimonate or indium antimonate dispersed in a polymeric film-forming binder. Of these conductive metal oxides, antimony-doped tin oxide and zinc antimonate are preferred. A granular, antimony-doped tin oxide particle commercially available from Ishihara Sangyo Kaisha under the tradename "SN-100P" was disclosed as particularly preferred in Japanese Kokai Nos. 04-062543, 06-161033, and 07-168293. Surface electrical resistivity (SER) values were reported in U.S. Pat. No. 5,382,494 for conductive layers measured prior to overcoating with a transparent magnetic recording layer as ranging from $10^5$ to $10^7$ ohms/square and from $10^6$ to $10^8$ ohms/square after overcoating. Surface resistivity values of about $10^8$ to $10^{11}$ ohms/square for conductive layers overcoated with a transparent magnetic recording layer were reported in U.S. Pat. Nos. 5,457,013 and 5,459,021.

The use of colloidal, electrically-conductive metal antimonate particles (e.g., zinc antimonate) in antistatic layers for imaging elements, especially for silver halide-based photographic elements, is broadly claimed in U.S. Pat. No. 5,368,995. Further, the use of colloidal, conductive metal antimonate particles in antistatic layers in combination with a transparent magnetic recording layer is taught in U.S. Pat. No. 5,457,013. However, dry weight coverages of metal antimonates in conductive subbing and backing layers sufficient to provide preferred levels of electrical conductivity for antistatic protection of imaging elements produce an undesirable increase in optical density because of absorption and haze due to scattering by agglomerates of particles. The requirements for low optical density, low haze, lack of photoactivity, and low manufacturing cost dictate that such a conductive layer must be coated using as low a dry weight coverage of metal antimonate as possible. Further, for the conductive layers disclosed in the '013 patent containing less than about 85% zinc antimonate by weight, the internal resistivity of the conductive layer increased appreciably after overcoating with a transparent magnetic recording layer.

An imaging element consisting of a support, at least one image-forming layer, a transparent magnetic recording layer, and at least one transparent, electrically-conductive layer, wherein the electrically-conductive layer contains both colloidal electrically-conductive metal antimonate particles and colloidal, non-conductive, metal-containing filler particles of comparable or smaller size, and one or more film-forming polymeric binders is disclosed in copending U.S. application Ser. No. 08/970,130 (filed Nov. 13, 1997) assigned to the same assignee as the present application and incorporated herein by reference. A wide variety of non-conductive metal-containing filler particles can be substituted for the conductive metal antimonate particles. Suitable non-conductive filler particles include metal oxides, clays, proto-clays, clay-like minerals, zeolites, micas, talcs, and the like. Particularly suitable non-conductive filler particles include colloidal (e.g., ~0.002–0.050 μm) particles of non-conductive tin oxide, zinc oxide, antimony pentoxide, zinc antimonate, silica, alumina-modified silica, various natural clays, synthetic clays, and the like. Such filler particles can be substituted for up to about 75% of the conductive metal antimonate particles without an appreciable decrease (i.e., ≦1 log ohm/square) in the surface electrical conductivity of the conductive layer.

A three-component antistatic layer which includes a smectite clay, one or more additive(s) or polymeric binder(s) which can sufficiently intercalate in or exfoliate the smectite clay, and one or more film forming polymeric binders which do not sufficiently intercalate in and/or exfoliate the conducting smectite clay is disclosed in U.S. application Ser. No. 08/940,860 (filed Sep. 29, 1997) assigned to the same assignee as the present application and incorporated herein by reference. Polymeric binders which do not intercalate or exfoliate the smectite clay can still be incorporated in a functional antistatic layer, by the inclusion of one of the polymeric binders disclosed therein which can sufficiently intercalate in and/or exfoliate the smectite clay as a co-binder. This allows a wider selection of polymeric binders with different physical and chemical characteristics to be used in antistatic layers while maintaining the benefits provided by the polymer-intercalated clay filler particles. The overall performance of the three-component conductive layers described in the '860 application include improved surface resistivity, backmark retention, splice strength, and trackoff for paper supports. However, one noteworthy deficiency of conductive layers containing clay, intercalated clay or exfoliated clay as the conductive filler is that unless the conductive layer is overcoated with a non-permeable protective layer such as poly(methylmethacrylate), for example, the conductivity of the layer is substantially diminished by photographic processing. The use of such a polymer intercalated or exfoliated smectite clay in combination with electronically-conductive metal-containing colloidal particles, such as antimony-doped tin oxide or zinc antimonate, in a transparent, processing-surviving, antistatic layer underlying a transparent magnetic recording layer in imaging elements was neither disclosed nor anticipated by the '860 application.

Because the requirements for an electrically-conductive layer to be useful in an imaging element are extremely demanding, the art has long sought to develop improved conductive layers exhibiting a balance of the necessary chemical, physical, optical, and electrical properties. As indicated hereinabove, the prior art for providing electrically-conductive layers useful for imaging elements is extensive and a wide variety of suitable electrically-conductive materials have been disclosed. However, there is still a critical need for improved conductive layers which can be used in a wide variety of imaging elements, which can be manufactured at a reasonable cost, which are resistant to the effects of humidity change, which are durable and abrasion-resistant, which do not exhibit adverse sensitometric or photographic effects, which exhibit acceptable adhesion to overlying and underlying layers, which exhibit suitable cohesion, and which are substantially insoluble in solutions with which the imaging element comes in contact, such as processing solutions used for silver halide photographic elements. One objective of this invention is to provide a conductive layer containing lower dry weight coverages of conductive metal-containing particles than those of prior art. Another objective of this invention is to provide a conductive layer which exhibits improved adhesion and minimal increase in resistivity when overcoated with a transparent magnetic recording layer relative to conductive layers of prior art. Furthermore, to provide both effective magnetic recording properties and effective electrical conductivity characteristics in an imaging element, without impairing the required imaging characteristics, poses an even greater technical challenge. Thus, it is toward the objective of providing a combination of a transparent magnetic recording layer and an underlying electrically-conductive layer that more effectively meet the diverse needs of imaging elements, especially those of silver halide photographic films as well as those of a wide range of other types of imaging elements, that the present invention is directed.

SUMMARY OF THE INVENTION

The present invention is an imaging element which includes a support, an image-forming layer superposed on said support, a transparent magnetic recording layer superposed on said support; and an electrically-conductive layer superposed on said support. The transparent magnetic recording layer is composed of magnetic particles dispersed in a first film-forming polymeric binder. The electrically-conductive layer includes electrically-conductive metal-containing colloidal particles, swellable, smectite clay particles, a first polymeric binder which can sufficiently intercalate inside or exfoliate the smectite clay particles and a second film-forming polymeric binder, wherein the electrically-conductive metal-containing particles and the polymer-intercalated or polymer-exfoliated smectite clay particles are dispersed.

BRIEF DESCRIPTION OF THE DRAWINGS

FIG. 1 is a plot showing the relationship between the basal (001) spacing of the swellable, smectite clay particles determined by an x-ray diffraction technique and the weight percentage of the intercalating and/or exfoliating polymer.

For a better understanding of the present invention, together with other objects, advantages and capabilities thereof, reference is made to the following description and claims in connection with the above-described drawings.

DETAILED DESCRIPTION OF THE INVENTION

This invention provides a multilayer imaging element for use in an image-forming process consisting of a support, at least one image-forming layer, a transparent magnetic recording layer, and a transparent, electrically-conductive layer. The transparent magnetic recording layer contains magnetic particles dispersed in a first film-forming polymeric binder. The transparent, electrically-conductive layer consists of four required components which include: (1) electrically-conductive metal-containing colloidal particles; (2) swellable, smectite clay particles; (3) a polymer capable of sufficiently intercalating inside and/or exfoliating the smectite clay particles; and (4) a second film-forming polymeric binder. The conductive metal-containing particles and the polymer-intercalated smectite clay particles are co-dispersed in the second polymeric binder. The second film-forming polymeric binder also can be a polymer capable of sufficiently intercalating in and/or exfoliating the smectite clay particles and in some cases, is identical to the polymer of (3). The conductive layer of this invention also can include an optional crosslinking agent to further improve the properties of the conductive layer as well as other optional additives typically present in imaging elements.

One class of electrically-conductive metal-containing colloidal particles useful for the electrically-conductive layers of this invention are semiconductive colloidal metal oxide particles. Suitable semiconductive metal oxide particles are those which exhibit a specific (volume) resistivity of less than $1 \times 10^5$ ohm-cm, preferably less than $1 \times 10^3$ ohm-cm, and more preferably, less than $1 \times 10^2$ ohm-cm. Examples of suitable semiconductive metal oxides include: zinc oxide, titania, tin oxide, alumina, indium oxide, silica, magnesia, zirconia, barium oxide, molybdenum trioxide, tungsten trioxide, vanadium pentoxide, zinc antimonate, and indium antimonate. Such semiconductive metal oxides are typically doped with donor heteroatoms or exhibit an oxygen atom deficiency. Examples of donor atom-doped semiconductive metal oxides include antimony-doped tin oxide, niobium-doped tin oxide, fluorine-doped tin oxide, tin-doped indium sesquioxide, aluminum-doped zinc oxide, indium-doped zinc oxide, niobium-doped titanium dioxide, and tantalum-doped titanium dioxide. The semiconductive metal oxide that has been most widely used in electrically-conductive layers for photographic imaging elements is antimony-doped tin oxide. Preferred antimony-doped tin oxide granular particles have antimony dopant levels ranging from about 8–20 atom % and also exhibit a very small primary particle size, typically, less than 20 nm. Such a small particle size minimizes light scattering which would result in reduced optical transparency of the conductive coating. In addition to ensuring transparency of the thin conductive layers, a small average particle size is needed to form the multiplicity of interconnected chains or network of conductive particles which provide multiple electrically conductive pathways through the layer. A variety of suitable semiconductive, crystalline, antimony-doped tin oxide powders are commercially available from various sources including Keeling & Walker Ltd., Ishihara Sangyo Kaisha Ltd., Dupont Performance Chemicals, Mitsubishi Metals, Nissan Chemical Industries Ltd., and others. Other electrically-conductive metal containing colloidal particles useful in the present invention include conductive metal carbides, conductive metal nitrides, conductive metal silicides, and conductive metal borides.

In one particularly preferred embodiment of the present invention, electrically-conductive granular zinc antimonate particles are included in the electrically-conductive layer. Suitable conductive zinc antimonate particles are commercially available in the form of an aqueous or organic solvent-based colloidal dispersion from Nissan Chemical Industries, Ltd.. The use of electrically-conductive metal antimonate colloidal particles in electrically-conductive layers for imaging elements, especially antistatic layers for silver halide photographic elements, is broadly disclosed in U.S. Pat. Nos. 5,368,995 and 5,457,013, which are included herein by reference.

In order to improve the optical and ultraviolet transparency, decrease haze, improve adhesion, and substantially decrease dry weight coverage of the metal-containing conductive particles, non-conductive clay particles can be partially substituted for various amounts of the metal-containing particles in the electrically-conductive layer. At appropriate levels, such substitution typically results in only a slight decrease in conductivity of the conductive layer. Suitable clays include natural clays, such as kaolinite, bentonite, and especially swellable or delaminatable smectite clays such as montmorillonite, beidellite, hectorite, and saponite. One preferred smectite clay closely resembles the natural clay mineral hectorite in both structure and composition. Hectorite is a layered hydrous magnesium silicate that belongs to the class of clays and clay-related minerals known as "swellable" clays, is relatively rare, and typically is contaminated with other minerals such as quartz or ionic species which are difficult to remove. One particularly preferred synthetic hectorite that can be prepared contaminant-free under controlled conditions is available commercially from Laporte Industries, Ltd. under the tradename "Laponite". Several different grades of Laponite are available (e.g., RD, RDS, J, S, etc.). Several of these grades are treated with a polyphosphate peptising agent such as tetrasodium pyrophosphate to provide rapid aqueous dispersion capability.

The crystallographic structure of the preferred Laponite synthetic hectorite clay can be described as a three-layer hydrous magnesium silicate in which the central layer contains magnesium ions octahedrally coordinated by oxygen, hydroxyl or fluoride ions, wherein the magnesium ions can be partially substituted with suitable monovalent ions such as lithium, sodium, potassium, and/or vacancies. This central octahedrally coordinated layer is sandwiched between two other layers containing silicon ions tetrahedrally coordinated by oxygen ions. Individual hectorite clay particles can be readily swollen using deionized water and ultimately exfoliated to provide a stable aqueous dispersion of tiny platelets (smectites) with an average diameter of about 0.025–0.050 $\mu$m and an average thickness of about 0.001 $\mu$m known as a "sol". Typical weight concentrations of Laponite in a sol can be 0.1% through 10%. During dispersion in deionized water an electrical double layer forms around the smectites resulting in electrostatic repulsion between particles and no extended structure formation and little increase in viscosity. However, in the presence of an electrolyte, this double layer can be collapsed thus reducing the electrostatic repulsions between individual platelets and generating various associative structures, such as the so-called "house-of-cards" structure, which can exhibit long-range ordering. Because of the readily reversible nature of the weak attractive forces between the platelets, these structures can be easily broken and reformed, producing a highly thixotropic system exhibiting low viscosity under shear and having a high yield value.

A Laponite sol can be combined with a dispersion of a suitable polymeric film-forming binder and applied to a support to provide transparent layers which can be electrically-conductive at high clay to polymeric binder weight ratios and moderate to high relative humidity. However, the level of electrical conductivity provided by such layers is dependent on relative humidity and is substantially degraded by color photographic processing. Further, at the high clay to binder weight ratios required to obtain adequate levels of electrical conductivity, adhesion of overlying layers to the conductive layer is typically poor. In addition, the poor cohesion of such highly filled clay-containing conductive layers can result in unacceptable levels of dusting, especially at low volume fractions of polymeric binder. Thus, such clay-containing layers are unsuitable for use in antistatic layers or electrodes for wet-processed photographic elements without an overlying protective layer.

The dispersion of swellable, smectite clay particles in a polymer matrix can result in the formation of three general types of clay/polymer composite materials as described by Lan et al. (T. Lan, P. D. Kaviratna, and T. J. Pinnavia, *Chem. Mater.*, 7, 2144(1995)): (1) Conventional composites containing clay particles with the intralamellar regions unintercalated by polymer wherein the clay particles are dispersed in the polymer with face-to-face clay particle aggregation and macroscopic segregation; (2) Intercalated clay/polymer composites exhibiting ordered structure resulting from the insertion or intercalation of one or more molecular layers of polymer into intralamellar regions of the clay particles; (3) Fully exfoliated clay/polymer composites wherein the individual clay smectites or platelets are dispersed in a continuous polymer matrix. Additional descriptive information concerning the intercalation and exfoliation of swellable, layered clay particles by polymers and oligomers is provided in U.S. Pat. No. 5,552,469 and references cited therein.

The extent of intercalation and the exfoliation of layered, swellable clay particles can be conveniently monitored by measuring the basal (001) spacing of the clay platelets using an x-ray diffraction technique such as that described by Giannelis et al. in U.S. Pat. No. 5,554,670. Upon intercalation of a polymer or other molecular species into the intralamellar region (i.e., "gallery") of swellable clay particles, an increase in the basal (001) spacing of the clay is observed. As the extent of exfoliation increases, the x-ray diffraction peaks broaden and lose intensity, until the clay is fully exfoliated, when these diffraction peaks ultimately disappear as long range crystallographic order is lost. Polymers capable of "sufficiently" intercalating inside clay particles can be defined to be those which produce an increase in the basal plane spacing of 50 percent or more as the clay to binder weight ratio is changed from 100:0 to 30:70. For example, the change in basal spacing of a preferred swellable smectite clay, such as Laponite RDS, as a function of the weight percentage of a preferred polyesterionomer, AQ-55D (Eastman Chemical Co.), capable of "sufficiently" intercalating in the clay particles is depicted in FIG. 1. The volume expansion of the clay particles upon intercalation of polymer produces a decrease in the effective bulk density of the clay particles. In a coated layer, intercalated/exfoliated clay particles effectively occupy a larger volume percentage of the layer than an equivalent weight of untreated clay particles. For example, at a clay to intercalating polymer weight ratio of 50:50 for the combination of Laponite RDS clay and AQ-55D polyesterionomer, the basal spacing of the clay particles is on the order of 19.7 Å. This corresponds to a decrease in the effective density of the clay from about 2.53 g/cm$^3$ to 2.09 g/cm$^3$. However, in the case of polymer-exfoliated clay particles which can be achieved, for example, at a Laponite RDS clay to AQ-55D polyesterionomer weight ratio of 30:70, it is not possible to determine the basal spacing of the clay particles using the x-ray diffraction technique described in the '670 Patent because of the broadness of the 001 diffraction peak as depicted in FIG. 1. Thus, it is not possible to make a meaningful estimate for the effective density of such polymer-exfoliated clay particles.

Electrically-conductive backing layers for photographic paper containing a swellable smectite clay in combination with a polymeric binder capable of sufficiently intercalating inside or exfoliating the clay particles and a non-intercalating, film-forming polymeric binder as disclosed in co-pending U.S. application Ser. No. 08/940,860 (filed Sep. 29, 1997) provide superior surface resistivity, backmark retention, splice strength, and track-off performance relative to two-component conductive layers containing only smectite clay particles and a non-intercalating polymeric binder. However, such three-component conductive layers also exhibit poor dry and/or wet adhesion to typical overlying transparent magnetic recording layers for the high clay to polymeric binder weight ratios necessary to produce adequate levels of surface conductivity and thus, may be unsuitable for use as antistatic subbing layers underlying a transparent magnetic recording layer.

The conductive layers of this invention minimize the previously cited deficiencies of multi-component conductive layers containing either metal-containing conductive particles and/or clay particles of prior art by using a combination of four key components which include: (1) electrically-conductive metal-containing particles; (2) swellable smectite clay particles; (3) a polymer capable of sufficiently intercalating inside or exfoliating the clay particles; (4) a film-forming polymeric binder. Smectite clay particles which have been intercalated or exfoliated by a suitable amount of an intercalating polymer can be substituted for a portion of the metal-containing conductive particles and are co-dispersed with them in the polymeric film-forming binder in a manner similar to that disclosed in co-pending U.S. application Ser. No. 08/970,130 (filed Nov. 13, 1997) for the substitution of conductive metal antimonate particles by colloidal non-conductive filler particles in conductive layers. In addition to decreased optical losses due to absorption and scattering and lower materials cost because of the use of less conductive metal-containing particles, many of the other improvements in performance resulting from the use of intercalated or exfoliated smectite clay particles as disclosed in co-pending U.S. application Ser. No. 08/940,860 (filed Sep. 29, 1997) are also provided by the conductive layers of this invention. Further, the four-component conductive layers of this invention provide improved wet and dry adhesion to an overlying layer, such as a transparent magnetic recording layer or a protective backing layer.

Suitable polymeric binders which are capable of sufficiently intercalating inside or exfoliating smectite clay particles include water soluble polymers such as poly(vinyl alcohol), poly(ethylene oxide), sodium poly(styrene sulfonate), poly(acrylamide), poly(methacrylamide), poly (N,N-dimethacrylamide), poly(N-isopropylacrylamide), poly(vinylpyrrolidone), sodium or potassium poly (vinylpyrrolidone); hydrophilic colloids such as gelatin, poly(saccharides); water-insoluble latex polymers such as polymers and interpolymers of styrene, styrene derivatives, maleic acid, vinyl acetate, vinyl chloride, vinylidene chloride, acrylic acid, methacrylic acid, alkyl acrylates or alkyl methacrylates and the like, olefins, acrylonitrile, polyurethanes, polyesterionomers, and others disclosed in co-pending U.S. application Ser. No. 08/940,860 (filed Sep. 29, 1997) and U.S. Pat. Nos. 5,552,469 and 5,698,624. Water insoluble latex polymers are of particular importance because of their widespread use in imaging elements. Preferred polymers include water-dispersible polyesterionomers and select polyurethanes, as well as water soluble polymers such as sulfonated polystyrene polymers and sulfonated styrene/maleic anhydride copolymers. Several particularly preferred water-dispersible polyesterionomers are available from Eastman Chemical Co. under the tradenames "AQ-55D" and "AQ-29D".

Polymeric film-forming binders useful in conductive layers of this invention include: cellulose derivatives such as carboxymethyl cellulose, hydroxyethyl cellulose, cellulose acetate butyrate, diacetyl cellulose or triacetyl cellulose; aqueous emulsions of addition-type polymers and interpolymers prepared from ethylenically unsaturated monomers such as acrylates including acrylic acid, methacrylates including methacrylic acid, acrylamides and methacrylamides, itaconic acid and its half-esters and diesters, styrenes including substituted styrenes, acrylonitrile and methacrylonitrile, vinyl acetates, vinyl ethers, vinyl and vinylidene halides, and olefins and aqueous dispersions of selected polyurethanes and polyesterionomers. Aqueous-dispersed polyurethanes and polyesterionomers, and aqueous emulsions of vinylidene halide copolymers are preferred film-forming binders for conductive layers of this invention. Further, film-forming binders such as polyesterionomers (e.g., AQ-55D or AQ-29D) capable of sufficiently intercalating inside or exfoliating smectite clay particles, are also suitable.

Increases in volume fraction of the polymeric binder typically improves various binder-related properties of conductive layers, such as adhesion to the support, adhesion to overlying layers, and cohesion of the layer. Suitable total volume percentages of conductive metal-containing particles and filler particles in conductive layers can range from about 10 to 50%. The amount of particles in the conductive layer of this invention is preferably defined in terms of volume percentage rather than weight percentage because the densities of the conductive metal-containing particles and clay particles can vary widely. The lowest volume percentage of conductive metal-containing particles for which the layer is conductive is determined by the efficiency of conductive network formation by the conductive particles, which in turn depends on such factors as particle size, particle shape, particle-particle interactions, specific (volume) resistivity, type of film-forming polymeric binder, coating solvent(s), and additives (e.g., dispersing aids, colloid stabilizers, surfactants, coating aids, etc.) present as well as various other manufacturing process-related factors, such as post-coating drying conditions. The use of significantly less than about 10 volume percent of conductive metal-containing particles in the conductive layers of this invention will not provide an acceptable level of electrical conductivity. Use of significantly more than about 50 volume percent of conductive metal-containing particles defeats several of the objectives of this invention in that it results in increased optical absorption, increased haze due to scattering losses, diminished adhesion between the conductive layer and the support, decreased adhesion to overlying layers, as well as decreased cohesion of the conductive layer itself. Thus, the conductive layers of this invention contain conductive metal-containing particles in an amount of preferably 30 volume percent or less and more preferably, 20 volume percent or less.

The limiting percentage of conductive metal-containing particles in conductive layers of this invention that can be substituted by polymer-intercalated or exfoliated clay particles depends on the film-forming polymeric binder, the density of the polymer-intercalated or exfoliated clay particles, the amount of excess intercalating polymer present, the total dry weight coverage as well as the level of conductivity required. Other factors, such as the nature of the intercalating polymer and the strengths of various particle-particle interactions also can influence the extent of substitution possible. The amount of excess intercalating polymer present in the coated layer can be estimated as the total amount of the intercalating polymer present less the actual amount of polymer which is intercalated into the clay particles. The amount of intercalated polymer can be estimated from the decrease in density of the clay particles which can be calculated from the observed change in basal plane spacing. For the purpose of this estimation, the density of the intercalated polymer is assumed to be the same as that of the bulk density of the free (non-intercalated) polymer. The effective density of the clay particles then can be used to estimate the amount of excess polymer not intercalated inside the clay particles. Typically, this excess polymer can be treated as additional film-forming binder for the purpose of calculating the volume percentage composition of the coated conductive layers.

In conductive layers of this invention, zinc antimonate particles typically are present at from about 35 to 80% by weight of the conductive layer after drying. This corresponds to a volume percentage of zinc antimonate ranging from about 10 to 40%. About 10 to 50% of the conductive zinc antimonate particles can be substituted by polymer-intercalated clay particles in order to realize fully the advantages of the present invention. However, this range is strongly dependent on the particular polymeric binder(s) used, the total particle to binder weight ratio, as well as the total dry coverage. For example, in the case of a soluble, hydrophilic binder such as gelatin, less than about 20% of the zinc antimonate particles can be substituted by non-conductive filler particles at a total dry coverage for the conductive layer of less than 0.4 g/m$^2$ as disclosed in co-pending U.S. application Ser. No. 08/969,393 (filed Nov. 13, 1997). In the case of a water-insoluble dispersed polymeric binder such as a preferred polyurethane, nearly 50% of the zinc antimonate particles can be substituted by polymer-intercalated clay particles. However, the above ranges are only typical because of variability resulting from the particular type of intercalating polymer used, the extent of intercalation, and the percentage of excess intercalating polymer present. Therefore, the conductive layers of this invention preferably include 10 to 40 volume percent zinc antimonate, 5 to 25 volume percent polymer-intercalated or exfoliated clay particles, and from 50 to 85 volume percent total polymeric binder (i.e., film-forming polymeric binder plus excess intercalating polymer). The conductive layers of this invention more preferably include 10 to 30 volume percent of zinc antimonate, 5 to 15 volume percent of polymer-intercalated clay particles, and 60 to 80 volume percent total polymeric binder (i.e., film-forming polymeric binder plus excess intercalating polymer).

In addition to the colloidal metal-containing particles, polymer-intercalated clay particles, and one or more film-forming polymeric binders, other components that are well known in the photographic art also can be included in conductive layers of this invention. Other typical addenda, such as matting agents, surfactants or coating aids, polymer lattices to improve dimensional stability, thickeners or viscosity modifiers, hardeners or cross-linking agents, soluble antistatic agents, soluble and/or solid particle dyes, antifoggants, lubricating agents, and various other conventional additives optionally can be present in any or all of the layers of the multilayer imaging element of this invention.

Colloidal dispersions of conductive metal-containing particles and polymer-intercalated clay particles in suitable liquid vehicles can be formulated with polymeric film-forming binders and various addenda and applied to a variety of supports to form the electrically-conductive layers of this invention. Such supports can be either transparent or opaque (reflective). Transparent film supports can be either colorless or colored by the addition of a dye or pigment. Transparent support materials used in the practice of this invention may be comprised of any of a wide variety of synthetic high molecular weight polymeric films such as cellulose esters including cellulose diacetate, cellulose triacetate, cellulose acetate butyrate, cellulose acetate proprionate; cellulose nitrate; polyesters such as poly(ethylene terephthalate), poly(ethylene naphthalate) or poly(ethylene naphthalate) having included therein a portion of isophthalic acid, 1,4-cyclohexane dicarboxylic acid or 4,4-biphenyl dicarboxylic acid used in the preparation of the film support, polyesters wherein other glycols are employed such as, for example, cyclohexanedimethanol, 1,4-butanediol, diethylene glycol, polyethylene glycol; ionomers as described in U.S. Pat. No. 5,138,024, incorporated herein by reference, such as polyester ionomers prepared using a portion of the diacid in the form of 5-sodiosulfo-1,3-isophthalic acid or like ion containing monomers; polycarbonate; poly(vinyl acetal); polyolefins such as polyethylene, polypropylene; polystyrene; polyacrylates; and others; and blends or laminates of the above polymers. Of these film supports, cellulose triacetate, poly(ethylene terephthalate), and poly (ethylene naphthalate) prepared from 2,6-naphthalene dicarboxylic acids or derivatives thereof are preferred. Suitable opaque or reflective supports include paper, polymer-coated paper, including polyethylene-, polypropylene-, and ethylene-butylene copolymer-coated or laminated paper, synthetic papers, and pigment-containing polyesters and the like. The thickness of the support is not particularly critical. Support thicknesses of 2 to 10 mils (50 $\mu$m to 254 $\mu$m) are suitable for photographic elements in accordance with this invention. Photographic supports can be surface treated by various processes including corona discharge, glow discharge as described in U.S. Pat. No. 5,718,995, UV exposure, flame treatment, e-beam treatment, and solvent washing or overcoated with adhesion promoting primer or tie layers containing polymers such as vinylidene chloride-containing copolymers, butadiene-based copolymers, glycidyl acrylate or methacrylate containing copolymers, maleic anhydride containing copolymers, and the like.

Dispersions containing colloidal conductive metal-containing particles and polymer-intercalated clay particles, a polymeric non-intercalating film-forming binder, and various additives in a suitable liquid vehicle can be applied to the aforementioned film or paper supports using any of a variety of well-known coating methods. Handcoating techniques include using a coating rod or knife or a doctor blade. Machine coating methods include air doctor coating, reverse roll coating, gravure coating, curtain coating, bead coating, slide hopper coating, extrusion coating, spin coating and the like, as well as other coating methods known in the art.

The electrically-conductive layer of this invention can be applied to the support at any suitable coverage depending on the specific requirements of a particular type of imaging element. For example, for silver halide photographic films, total dry weight coverages for conductive layers containing both conductive metal-containing particles and polymer-intercalated clay particles are preferably in the range of from about 0.01 to 2 g/m$^2$. More preferred dry coverages are in the range of about 0.05 to 1 g/m$^2$. The conductive layers of this invention prior to overcoating with a transparent magnetic recording layer typically exhibit surface electrical resistivity (50% RH, 20° C.) values of less than $1\times10^{11}$ ohms/square, preferably less than $1\times10^{10}$ ohms/square, and more preferably less than $1\times10^9$ ohms/square.

Imaging elements including a transparent magnetic recording layer are well known in the imaging art as described hereinabove. Such a transparent magnetic recording layer contains a polymeric film-forming binder, ferromagnetic particles, and other optional addenda for improved manufacturability or performance such as dispersants, coating aids, fluorinated surfactants, crosslinking agents or hardeners, catalysts, charge control agents, lubricants, abrasive particles, filler particles, and the like as described, for example, in Research Disclosure, Item No. 34390 (November, 1992).

Suitable ferromagnetic particles include ferromagnetic iron oxides, such as: $\gamma$-Fe$_2$O$_3$, Fe$_3$O$_4$; $\gamma$-Fe$_2$O$_3$ or Fe$_3$O$_4$ bulk-doped or surface-treated with Co, Zn, Ni or other metals; ferromagnetic chromium dioxides such as CrO$_2$ or CrO$_2$ doped with Li, Na, Sn, Pb, Fe, Co, Ni, Zn or halogen atoms in solid solution; ferromagnetic transition metal ferrites; ferromagnetic hexagonal ferrites, such as barium and strontium ferrite; and ferromagnetic metal alloys with oxide coatings on their surface to improve chemical stability and/or dispersibility. In addition, ferromagnetic oxides with a shell of a lower refractive index particulate inorganic material or a polymeric material with a lower optical scattering cross-section as taught in U.S. Pat. Nos. 5,217,804 and 5,252,444 can be used. Suitable ferromagnetic particles exhibit a variety of sizes, shapes and aspect ratios. The preferred ferromagnetic particles for magnetic recording layers used in combination with the conductive layers of this invention are cobalt surface-treated $\gamma$-iron oxide with a specific surface area greater than 30 m$^2$/g.

As taught in U.S. Pat. No. 3,782,947, whether an element is useful for both photographic and magnetic recording depends on the size distribution and concentration of the ferromagnetic particles as well as the relationship between the granularities of the magnetic and the photographic layers. Generally, the coarser the grain of the silver halide emulsion in the photographic element containing a magnetic recording layer, the larger the mean size of the magnetic particles which are suitable can be. A magnetic particle coverage of from about 10 to 1000 mg/m$^2$, when uniformly distributed across the imaging area of a photographic imaging element, provides a magnetic recording layer that is suitably transparent to be useful for photographic imaging applications for particles with a maximum dimension of less than about 1 $\mu$m. Magnetic particle coverages less than about 10 mg/m$^2$ tend to be insufficient for magnetic recording purposes. Magnetic particle coverages greater than about 1000 mg/m$^2$ tend to produce magnetic recording layers with optical densities too high for photographic imaging. Particularly useful particle coverages are in the range of 20 to 70 mg/m$^2$. Coverages of about 20 mg/m$^2$ are particularly useful in magnetic recording layers for reversal films and coverages of about 40 mg/m$^2$ are particularly useful in magnetic recording layers for negative films. Magnetic particle concentrations of from about $1\times10^{-11}$ to $1\times10^{-10}$ mg/$\mu$m$^3$ are preferred for transparent magnetic recording layers prepared for use in accordance with this invention. A typical thickness for the transparent magnetic recording layer can range from about 0.05 to 10 $\mu$m.

Suitable polymeric binders for use in the magnetic recording layer include, for example: vinyl chloride-based copolymers such as, vinyl chloride-vinyl acetate copolymers, vinyl chloride-vinyl acetate-vinyl alcohol terpolymers, vinyl chloride-vinyl acetate-maleic acid terpolymers, vinyl chloride-vinylidene chloride copolymers, vinyl chloride-acrylonitrile copolymers; acrylic ester-acrylonitrile copolymers, acrylic ester-vinylidene chloride copolymers, methacrylic ester-vinylidene chloride copolymers, methacrylic ester-styrene copolymers, thermoplastic polyurethane resins, phenoxy resins, polyvinyl fluoride, vinylidene chloride-acrylonitrile copolymers, butadiene-acrylonitrile copolymers, acrylonitrile-butadiene-acrylic acid terpolymers, acrylonitrile-butadiene-methacrylic acid terpolymers, polyvinyl butyral, polyvinyl acetal, cellulose derivatives such as cellulose esters including cellulose acetate, cellulose diacetate, cellulose triacetate, cellulose acetate butyrate, cellulose acetate proprionate; and styrene-butadiene copolymers, polyester resins, phenolic resins, thermosetting polyurethane resins, melamine resins, alkyl resins, urea-formaldehyde resins and the like. Preferred binders for organic solvent-coated transparent magnetic recording layers are polyurethanes, vinyl chloride-based copolymers, and cellulose esters, particularly cellulose diacetate and cellulose triacetate.

Binders for transparent magnetic recording layers also can be film-forming hydrophilic polymers such as water soluble polymers, cellulose ethers, latex polymers and water-dispersible polyesters as described in Research Disclosures No. 17643 and 18716 and U.S. Pat. Nos. 5,147,768; 5,457, 012; 5,520,954, and 5,531,913. Suitable water-soluble polymers include gelatin, gelatin derivatives, casein, agar, starch, polyvinyl alcohol, acrylic acid copolymers, and maleic acid anhydride. Suitable cellulose ethers include carboxymethyl cellulose and hydroxyethyl cellulose. Other suitable aqueous binders include aqueous lattices of addition-type polymers and interpolymers prepared from ethylenically unsaturated monomers such as acrylates including acrylic acid, methacrylates including methacrylic acid, acrylamides and methacrylamides, itaconic acid and its half-esters and diesters, styrenes including substituted styrenes, acrylonitrile and inethacrylonitrile, vinyl acetates, vinyl ethers, vinyl chloride copolymers and vinylidene chloride copolymers, and butadiene copolymers and aqueous dispersions of polyurethanes or polyesterionomers. Preferred hydrophilic binders include gelatin, gelatin derivatives, and combinations of gelatin with a polymeric cobinder. Preferred gelatins include any alkali- or acid-treated gelatins.

The binder in the magnetic recording layer can be optionally cross-linked. Binders which contain active hydrogen atoms including —OH, —NH$_2$, —NHR, where R is an organic radical, and the like, can be crosslinked using an isocyanate or polyisocyanate as described in U.S. Pat. No. 3,479,310. Suitable polyisocyanates include: tetramethylene diisocyanate, hexamethylene diisocyanate, diisocyanato dimethylcyclohexane, dicyclohexylmethane diisocyanate, isophorone diisocyanate, dimethylbenzene diisocyanate, methylcyclohexylene diisocyanate, lysine diisocyanate, tolylene diisocyanate, diphenylmethane diisocyanate, and polymers thereof; polyisocyanates prepared by reacting an excess of an organic diisocyanate with an active hydrogen-containing compounds such as polyols, polyethers and polyesters and the like, including ethylene glycol, propylene glycol, dipropylene glycol, butylene glycol, trimethylol propane, hexanetriol, glycerine sorbitol, pentaerythritol, castor oil, ethylenediamine, hexamethylenediamine, ethanolamine, diethanolamine, triethanolamine, water, ammonia, urea, and the like, including biuret compounds, allophanate compounds, and the like.

Further, hydrophilic binders can be hardened using any of a variety of methods known to one skilled in the art. Useful hardening agents include aldehyde compounds such as formaldehyde, ketone compounds, isocyanates, aziridine compounds, epoxy compounds, chrome alum, zirconium sulfate, and the like.

Examples of suitable solvents for coating the magnetic recording layer include: water; ketones, such as acetone, methyl ethyl ketone, methylisobutyl ketone, and cyclohexanone; alcohols, such as methanol, ethanol, isopropanol, and butanol; esters such as ethyl acetate and butyl acetate, ethers; aromatic solvents, such as toluene; and chlorinated hydrocarbons, such as carbon tetrachloride, chloroform, dichloromethane; trichloromethane, trichloroethane, tetrahydrofuran; glycol ethers such as ethylene glycol monomethyl ether, and propylene glycol monomethyl ether; and ketoesters, such as methylacetoacetate. Optionally, due to the requirements of binder solubility, magnetic dispersibility and coating rheology, a mixture of solvents may be advantageous. One preferred solvent mixture consists of a chlorinated hydrocarbon, ketone and/or alcohol, and ketoesters. Another preferred solvent mixture consists of a chlorinated hydrocarbon, ketone and/or alcohols, and a glycol ether. Other preferred solvent mixtures include dichloromethane, acetone and/or methanol, methylacetoacetate; dichloromethane, acetone and/or methanol, propylene glycol monomethyl ether; and methylethyl ketone, cyclohexanone and/or toluene. For hydrophilic binders and water-soluble binders, such as gelatin, water is the preferred solvent.

As indicated hereinabove, the magnetic recording layer also can contain additional optional components such as dispersing agents, wetting agents, surfactants or fluorinated surfactants, coating aids, viscosity modifiers, soluble and/or solid particle dyes, antifoggants, matte particles, lubricants, abrasive particles, filler particles, antistatic agents, and other addenda that are well known in the photographic and magnetic recording arts.

The transparent magnetic recording layer can be positioned in an imaging element in any of various positions. For example, it can overlie one or more image-forming layers, or underlie one or more image forming layers, or be interposed between image-forming layers, or be coated on the side of the support opposite to the image-forming layer. In a preferred embodiment of this invention in which the imaging element is a silver halide photographic element, the transparent magnetic recording layer is located on the side of the support opposite the silver halide emulsion overlying the electrically-conductive layer of this invention.

Conductive layers of this invention can be incorporated into multilayer imaging elements in any of various configurations depending upon the requirements of the specific imaging element. In addition to underlying the transparent magnetic recording layer, conductive layers of this invention also can be present as backing, subbing, intermediate or protective overcoat layers on either or both sides of the support. Alternatively, the function of the conductive layer can be incorporated into the magnetic layer as described in U.S. Pat. Nos. 5,427,900 and 5,459,021. This function can be accomplished more effectively by introducing both the conductive metal-containing particles and polymer-intercalated and/or exfoliated smectite clay particles of this invention in combination with ferromagnetic particles in suitable concentrations and proportions into a single electrically-conductive transparent magnetic recording layer. Optional additional conductive layers also can be located on the same side of the support as the imaging layer(s) or on both sides of the support. A second conductive layer can be applied either underlying or overlying a gelatin subbing layer containing an antihalation dye or pigment. Alternatively, both antihalation and antistatic layer functions can be combined in a single layer containing conductive particles, antihalation dye, and a binder. Such a hybrid layer is typically coated on the same side of the support as the sensitized emulsion layer. Additional optional layers can be present as well. Further, an optional conductive layer can be used as an outermost layer of an imaging element, for example, as a protective layer overlying an image-forming layer. When a conductive layer is applied over a sensitized emulsion layer, it is not necessary to apply any intermediate layers such as barrier or adhesion-promoting layers between the conductive overcoat layer and the imaging layer(s), although they can optionally be present. Other addenda, such as polymer lattices to improve dimensional stability, hardeners or cross-linking agents, surfactants, matting agents, lubricants, and other additives can be present in any or all of the layers mentioned hereinabove.

Conductive layers of this invention underlying a transparent magnetic recording layer typically exhibit an internal resistivity of less than $1 \times 10^{11}$ ohms/square, preferably less than $1 \times 10^{10}$ ohms/square, and more preferably, less than $1 \times 10^9$ ohms/square.

Imaging elements in accordance with this invention can be of many different types depending on the particular use for which they are intended. Such imaging elements include, for example, photographic, thermographic, electrothermographic, photothermographic, dielectric recording, dye migration, laser dye-ablation, thermal dye transfer, electrostatographic, clectrophotographic imaging elements, as well as other thermally-processable imaging elements. Details with respect to the composition and function of a wide variety of different imaging elements are provided in U.S. Pat. No. 5,340,676 and in references described therein. The electrically-conductive layers of the present invention can be effectively employed in conjunction with any of the imaging elements described in the '676 patent and are particularly useful for solution-processed silver halide photographic elements. Suitable photosensitive image-forming layers are those which provide color or black and white images. Such photosensitive layers can be image-forming layers containing silver halides such as silver chloride, silver bromide, silver bromoiodide, silver chloro-bromide and the like. Both negative and reversal silver halide elements are contemplated. For reversal films, the emulsion layers described in U.S. Pat. No. 5,236,817, especially Examples 16 and 21, are particularly suitable. Any of the known silver halide emulsion layers, such as those described in *Research Disclosure*, Vol. 176, Item 17643 (December, 1978), *Research Disclosure*, Vol. 225, Item 22534 (January, 1983), *Research Disclosure*, Item 36544 (September, 1994), and *Research Disclosure*, Item 37038 (February, 1995) and the references cited therein are useful in preparing photographic elements in accordance with this invention.

In a particularly preferred embodiment, imaging elements including the electrically-conductive layers of this invention are photographic elements which can differ widely in structure and composition. For example, these photographic elements can vary greatly with regard to the type of support, the number and composition of the image-forming layers, and the number and types of auxiliary layers that are included in the elements. In particular, photographic elements can be still films, motion picture films, x-ray films, graphic arts films, paper prints or microfiche. It is also specifically contemplated to use the conductive layer of the present invention in small format films as described in *Research Disclosure*, Item 36230 (June 1994). Photographic elements can be either simple black-and-white or monochrome elements or multilayer and/or multicolor elements adapted for use in a negative-positive process or a reversal process. Generally, the photographic element is prepared by coating one side of the film support with one or more layers comprising a dispersion of silver halide crystals in an aqueous solution of gelatin and optionally one or more subbing layers. The coating process can be carried out on a continuously operating coating machine wherein a single layer or a plurality of layers are applied to the support. For multicolor elements, layers can be coated simultaneously on the composite film support as described in U.S. Pat. Nos. 2,761,791 and 3,508,947. Additional useful coating and drying procedures are described in *Research Disclosure*, Vol. 176, Item 17643 (Dec., 1978).

Imaging elements incorporating conductive layers in combination with a transparent magnetic recording layer in accordance with this invention also can contain additional layers including adhesion-promoting layers, lubricant or transport-controlling layers, hydrophobic barrier layers, antihalation layers, abrasion and scratch protection layers, and other special function layers. Such imaging elements are useful for specific imaging applications such as color negative films, color reversal films, black-and-white films, color and black-and-white papers, electrographic media, dielectric recording media, thermally processable imaging elements, thermal dye transfer recording media, laser ablation media, as well as other imaging applications readily apparent to those skilled in photographic and imaging arts.

The present invention is illustrated by the following detailed examples of its practice. However, the scope of this invention is by no means restricted to these illustrative examples.

EXAMPLES 1–5

Aqueous antistatic coating formulations containing colloidal conductive zinc antimonate particles with an average primary particle size of 0.015 to 0.030 µm (by BET), colloidal synthetic hectorite clay particles with an average platelet size of about 0.025 µm in diameter and about 0.001 µm in thickness (by TEM) intercalated with a polyesterionomer, aqueous dispersed polyurethane binder, and various other additives described below were prepared at nominally 3.1% total solids by weight. The synthetic hectorite clay particles were intercalated with the polyesterionomer by mixing a 4 weight % aqueous dispersion of the intercalating polymer with a 4 weight % aqueous dispersion of the synthetic clay at a clay to polymer weight ratio of 50:50. The resulting dispersion of clay intercalated with the polyesterionomer and excess polyesterionomer was combined with suitable amounts of dispersions of the conductive zinc antimonate particles and the non-intercalating polyurethane binder. The weight ratios of the zinc antimonate to clay intercalated with polyesterionomer plus excess polyesterionomer to polyurethane binder in the coating mixtures were nominally 55:15:30, 70:20:10, 40:20:40, 45:25:30, and 50:30:20 for the conductive layers of Examples 1, 2, 3, 4, and 5, respectively. These ratios are expressed in terms of volume percentages in Table 1. The corresponding coating formulations are given below:

|  | Weight % (wet) | | | | |
| --- | --- | --- | --- | --- | --- |
| Component | Ex.1 | Ex.2 | Ex.3 | Ex.4 | Ex.5 |
| ZnSb$_2$O$_6$[1] | 1.681 | 2.050 | 1.223 | 1.375 | 1.499 |
| Clay[2] | 0.229 | 0.293 | 0.305 | 0.382 | 0.450 |
| Polyesterionomer[3] | 0.229 | 0.293 | 0.305 | 0.382 | 0.450 |
| Polyurethane[4] | 0.917 | 0.293 | 1.222 | 0.917 | 0.600 |
| Wetting aid[5] | 0.033 | 0.033 | 0.033 | 0.033 | 0.033 |
| Deionized water | 96.911 | 97.038 | 96.912 | 96.911 | 96.968 |

[1]CELNAX CX-Z, Nissan Chemical Industries, Ltd.
[2]Laponite RDS, Laporte Industries, Ltd.
[3]AQ-55D, Eastman Chemical Co.
[4]Witcobond W-236, Witco Corp.
[5]Triton X-100, Rohm & Haas The above coating mixtures were applied to a moving web of 4 mil (100 µm) thick poly(ethylene terephthalate) film support using a coating hopper so as to provide nominal total dry coverages of 1 g/m$^2$ (Examples 1a, 2a, 3a, 4a, and 5a), 0.6 g/m$^2$ (Examples 1b, 2b, 3b, 4b, and 5b), and 0.3 g/m$^2$ (Example 2c). The film support had been coated with a typical primer layer consisting of a terpolymer latex of acrylonitrile, vinylidene chloride, and acrylic acid.

The conductive layers prepared hereinabove were overcoated with a transparent magnetic recording layer as described in *Research Disclosure*, Item 34390, November, 1992. The particular transparent magnetic recording layer employed contains cobalt surface-modified γ-Fe$_2$O$_3$ particles in a polymeric binder which optionally may be cross-linked and optionally may contain suitable abrasive particles. The polymeric binder consists of a blend of cellulose diacetate and cellulose triacetate. The binder was not crosslinked in the present examples. The magnetic recording layer was applied so as to provide a nominal total dry coverage of 1.5 g/m². An optional lubricant-containing topcoat layer comprising carnauba wax and a fluorinated surfactant as a wetting aid may be applied over the transparent magnetic recording layer to provide a nominal dry coverage of about 0.02 g/m². The resultant multilayer structure comprising an electrically-conductive antistatic layer overcoated with a transparent magnetic recording layer, an optional lubricant layer, and other additional optional layers is referred to herein as a "magnetic backing package."

The electrical performance of a magnetic backing package was evaluated by measuring the internal electrical resistivity of the conductive layer using a salt bridge wet electrode resistivity (WER) measurement technique (as described, for example, in "Resistivity Measurements on Buried Conductive Layers" by R. A. Elder, pages 251–254, *1990 EOS/ESD Symposium Proceedings*). Typically, conductive layers with WER values greater than about 12 log ohm/square are considered to be ineffective at providing static protection for photographic imaging elements. WER values less than about 10 log ohm/square are preferred.

Total optical and ultraviolet densities ($D_{min}$) of the magnetic backing packages were measured using a X-Rite Model 361 T B&W transmission densitometer at 530 and 380 nm, respectively. The contributions of the polymeric support (and any optional primer layers) were subtracted from the total $D_{min}$ values to obtain $\Delta$ UV $D_{min}$ and $\Delta$ Ortho $D_{min}$ values which correspond to the net contribution of the magnetic backings package to the total ultraviolet and optical densities.

Dry adhesion of the magnetic backing package was evaluated by scribing a small cross-hatched region into the coating with a razor blade. A piece of high-tack adhesive tape was placed over the scribed region and quickly removed multiple times. The number of times that the adhesive tape could be removed without removing any of the coating is a qualitative measure of the dry adhesion.

Wet adhesion was evaluated using a procedure which simulates wet processing of silver halide photographic elements. A one millimeter wide line was scribed into a sample of the magnetic backings package. The sample was then immersed in KODAK Flexicolor developer solution at 38° C. and allowed to soak for 3 minutes and 15 seconds. The test sample was removed from the heated developer solution and then immersed in another bath containing the Flexicolor developer at about 25° C. and a rubber pad (approximately 3.5 cm dia.) loaded with a 900 g weight was rubbed vigorously back and forth across the sample in the direction perpendicular to the scribe line. The relative amount of additional material removed is a qualitative measure of the wet adhesion of the various layers.

Descriptions of the magnetic backing packages of Examples 1–5, the internal resistivity (WER) values, net ultraviolet and optical densities ($\Delta D_{min}$), and dry and wet adhesion performance test results are given in Table 1.

COMPARATIVE EXAMPLES 1–5

Aqueous antistatic coating formulations containing colloidal conductive zinc antimonate particles with an average primary particle size of 0.015 to 0.030 μm (by BET), colloidal synthetic hectorite clay particles with an average platelet size of about 0.025 μm in diameter and about 0.001 μm in thickness (by TEM), aqueous dispersed polyurethane binder, and various other additives described below were prepared at nominally 3.1% total solids by weight. A 4% by weight aqueous dispersion of the clay particles (without intercalating polyesterionomer) was combined with suitable amounts of dispersions of the conductive zinc antimonate particles and the non-intercalating polyurethane binder. The weight ratios of the zinc antimonate to clay to polyurethane binder in the coating mixtures were nominally 55:15:30, 70:20:10, 40:20:40, 45:25:30, and 50:30:20 for the conductive layers of Comparative Examples 1, 2, 3, 4, and 5, respectively. These ratios expressed in terms of volume percentages are given in Table 1. The corresponding coating formulations are given below:

| Component | Weight % (wet) | | | | |
| --- | --- | --- | --- | --- | --- |
| | Comp. Ex.1 | Comp. Ex.2 | Comp. Ex.3 | Comp. Ex.4 | Comp. Ex.5 |
| $ZnSb_2O_6$[1] | 1.681 | 2.050 | 1.223 | 1.375 | 1.499 |
| Clay[2] | 0.458 | 0.586 | 0.610 | 0.764 | 0.900 |
| Polyurethane[3] | 0.917 | 0.293 | 1.222 | 0.917 | 0.600 |
| Wetting aid[4] | 0.033 | 0.033 | 0.033 | 0.033 | 0.033 |
| Deionized water | 96.911 | 97.038 | 96.912 | 96.911 | 96.968 |

[1]CELNAX CX-Z, Nissan Chemical Industries, Ltd.
[2]Laponite RDS, Laporte Industries, Ltd.
[3]Witcobond W-236, Witco Corp.
[4]Triton X-100, Rohm & Haas The above coating mixtures were applied to a moving web of 4 mil (100 μm) thick poly(ethylene terephthalate) film support using a coating hopper so as to provide a nominal total dry coverage of 1 g/m² (Comparative Examples 1a, 2a, 3a, 4a, and 5a), 0.6 g/m² (Comparative Examples 1b, 2b, 3b, 4b, and 5b), and 0.3 g/m² (Comparative Example 2c). The film support had been coated with a typical primer layer consisting of a terpolymer latex of acrylonitrile, vinylidene chloride, and acrylic acid.

The conductive layers prepared hereinabove were overcoated with a transparent magnetic recording layer as described in Examples 1–5 to form the corresponding magnetic backing packages. Measurement results for the internal resistivity (WER), net ultraviolet and optical densities ($\Delta D_{min}$), and dry and wet adhesion for the resulting magnetic backing packages of Comparative Examples 1–5 are given in Table 1.

COMPARATIVE EXAMPLES 6–7

Aqueous antistatic coating formulations containing Laponite RDS colloidal synthetic hectorite clay particles (Laporte Industries, Ltd.) with an average platelet size of about 0.025 μm in diameter and about 0.001 μm in thickness (by TEM) intercalated with AQ-55D polyesterionomer (Eastman Chemical Co.), aqueous-dispersed W-236 polyurethane (Witco Corp.) binder, and other additives described hereinabove were prepared at nominally 3.1% total solids by weight. The synthetic hectorite clay particles were intercalated with the polyesterionomer by mixing a 4 weight % aqueous dispersion of the intercalating polymer with a 4 weight % aqueous dispersion of the synthetic clay at a clay to polymer weight ratio of 50:50. The resulting dispersion of polymer-intercalated clay was combined with the non-intercalating polyurethane binder dispersion. The weight ratios of the polymer-intercalated clay to polyurethane binder in the coating mixtures were nominally 70:30 and 90:10 for the conductive layers of Comparative Examples 6 and 7, respectively. These ratios expressed in terms of volume percentages are given in Table 1. The coating mixtures were applied to a moving web of 4 mil (100 μm)

thick poly(ethylene terephthalate) film support using a coating hopper so as to provide a nominal total dry coverage of 1 g/m². The film support had been coated with a typical primer layer consisting of a terpolymer latex of acrylonitrile, vinylidene chloride, and acrylic acid.

The conductive layers prepared hereinabove were overcoated with a transparent magnetic recording layer as described in Examples 1–5 to form the corresponding magnetic backing packages. Measurement results for the internal resistivity (WER), net ultraviolet and optical densities ($\Delta D_{min}$), and dry and wet adhesion performance for the resulting magnetic backing packages of Comparative Examples 6 and 7 are given in Table 1.

EXAMPLES 6–9

Aqueous antistatic coating formulations containing colloidal conductive zinc antimonate particles with an average primary particle size of 0.015 to 0.030 μm (by BET), colloidal synthetic hectorite clay particles with an average platelet size of about 0.025 μm in diameter and about 0.001 μm in thickness (by TEM), a polyesterionomer, an aqueous dispersed polyurethane binder, and various other additives described below were prepared at nominally 3.1% total solids by weight. The synthetic hectorite clay particles were first exfoliated by mixing a 4 weight % aqueous dispersion of AQ-55D polyesterionomer with a 4 weight % aqueous dispersion of the synthetic clay at a clay to polymer weight ratio of 30:70. The resulting dispersion of clay particles exfoliated with polyesterionomer and excess polyesterionomer was combined with suitable amounts of aqueous dispersions of the conductive zinc antimonate particles and the non-intercalating polyurethane binder. The weight ratios of the zinc antimonate to clay exfoliated with polyesterionomer plus excess polyesterionomer to polyurethane binder in the coating mixtures were nominally 55:15:30, 40:20:40, 45:25:30, and 50:30:20 for the conductive layers of Examples 6, 7, 8, and 9, respectively. The corresponding coating formulations are given below:

| Component | Weight % (wet) | | | |
| --- | --- | --- | --- | --- |
| | Ex.6 | Ex.7 | Ex.8 | Ex.9 |
| ZnSb$_2$O$_6$[1] | 1.681 | 1.223 | 1.375 | 1.499 |
| Clay[2] | 0.137 | 0.183 | 0.229 | 0.270 |
| Polyesterionomer[3] | 0.321 | 0.427 | 0.535 | 0.630 |
| Polyurethane[4] | 0.917 | 1.222 | 0.917 | 0.600 |
| Wetting aid[5] | 0.033 | 0.033 | 0.033 | 0.033 |
| Deionized water | 96.911 | 96.912 | 96.911 | 96.968 |

[1]CELNAX CX-Z, Nissan Chemical Industries, Ltd.
[2]Laponite RDS, Laporte Industries, Ltd.
[3]AQ-55D, Eastman Chemical Co.
[4]Witcobond W-236, Witco Corp.
[5]Triton X-100, Rohm & Haas The above coating mixtures were applied to a moving web of 4 mil (100 μm) thick poly(ethylene terephthalate) film support using a coating hopper so as to provide nominal total dry coverages of 1 g/m² (Examples 6a, 7, 8, and 9) and 0.6 g/m² (Example 6b). The film support had been coated with a typical primer layer consisting of a terpolymer latex of acrylonitrile, vinylidene chloride, and acrylic acid.

The conductive layers prepared hereinabove were overcoated with transparent magnetic recording layers as described in Examples 1–5 to form the corresponding magnetic backing packages. Measurement results for the internal resistivity (WER), net ultraviolet and optical densities ($\Delta D_{min}$), and dry and wet adhesion performance for the resulting magnetic backing packages of Examples 6–9 are given in Table 2.

COMPARATIVE EXAMPLES 8–11

Aqueous antistatic coating formulations containing colloidal conductive zinc antimonate particles with an average primary particle size of 0.015 to 0.030 μm (by BET) and aqueous dispersed polyurethane binder, and various other additives described below were prepared at nominally 3.1% total solids by weight as described in Comparative Examples 1–4 of U.S. application Ser. No. 08/970,130 (filed Nov. 13, 1997). The weight ratios of the zinc antimonate to polyurethane binder in the coating mixtures were nominally 80:20, 70:30, 60:40, and 50:50 for the conductive layers of Comparative Examples 8, 9, 10, and 11, respectively. These ratios expressed in terms of volume percentages are given in Table 2. The coating mixtures were applied to a moving web of 4 mil (100 μm) thick poly(ethylene terephthalate) film support using a coating hopper so as to provide a nominal total dry coverage of 1 g/m². The film support had been coated with a typical primer layer consisting of a terpolymer latex of acrylonitrile, vinylidene chloride, and acrylic acid.

The conductive layers prepared hereinabove were overcoated with transparent magnetic recording layers as described in Examples 1–5 of this invention to form the corresponding magnetic backing packages. Measurement results for the internal resistivity (WER), net ultraviolet and optical densities ($\Delta D_{min}$), and dry and wet adhesion performance for the resulting magnetic backing packages of Comparative Examples 8–11 are given in Table 2.

COMPARATIVE EXAMPLES 12–15

Aqueous antistatic coating formulations containing colloidal synthetic hectorite clay particles with an average platelet size of about 0.025 μm in diameter and about 0.001 μm in thickness (by TEM) and a non-intercalating polyurethane binder dispersion were prepared at nominally 3.1% total solids by weight by the method of Comparative Example 6 of U.S. application Ser. No. 08/970,130 (filed Nov. 13, 1997). The weight ratios of clay to polyurethane binder in the coating mixtures were nominally 60:40, 70:30, 80:20, and 90:10 for the conductive layers of Comparative Examples 12, 13, 14, and 15, respectively. These ratios are expressed in terms of volume percentages in Table 2. The coating mixtures were applied to a moving web of 4 mil (100 μm) thick poly(ethylene terephthalate) film support using a coating hopper so as to provide a nominal total dry coverage of 1 g/m². The film support had been coated previously with a typical primer layer consisting of a terpolymer latex of acrylonitrile, vinylidene chloride, and acrylic acid.

The conductive layers prepared hereinabove were overcoated with transparent magnetic recording layers in the manner described in Examples 1–5 of this invention to form the corresponding magnetic backing packages. Measurement results for the internal resistivity (WER), net ultraviolet and optical densities ($\Delta D_{min}$), and dry and wet adhesion performance for the resulting magnetic backing packages of Comparative Examples 12–15 are summarized in Table 2.

As demonstrated by the results for the Examples described hereinabove, magnetic backing packages incorporating the four-component conductive layers of this invention provide comparable WER values at lower total weight and volume percentages of conductive metal-containing particles, comparable or decreased net ultraviolet and optical densities ($\Delta D_{min}$), comparable or improved dry adhesion, and superior wet adhesion performance compared to similar magnetic backing packages of prior art. For example, both wet and dry adhesion performance of the magnetic backing packages of Examples 1–5 are excellent or improved compared to the wet and dry adhesion performance of the corresponding magnetic backing packages of Comparative Examples 1–5 prepared using coating formulations with similar nominal dry weight ratios of zinc antimonate, clay (i.e., AQ-55D intercalated clay for Examples 1–5 and non-intercalated clay for Comparative Examples 1–5), and polyurethane-binder. The WER values for the magnetic backing packages of Examples 1–5 typically deviate less than 1 log ohm/square from those for Comparative Examples 1–5. Further, the WER values for the magnetic backing packages of Examples 1–5 are comparable to those of Comparative Examples 8–11 containing zinc antimonate and polyurethane binder without clay particles for corresponding weight percentages of total particles and total dry weight coverages. Also, the average $\Delta UV\ D_{min}$ values for the magnetic backing packages of Examples 1–5 are significantly lower than the average $\Delta UV\ D_{min}$ values for the corresponding magnetic backing packages of Comparative Examples 8–11 not containing clay.

Magnetic backing packages containing clay particles and polyurethane binder without zinc antimonate typically exhibit very poor adhesion performance as demonstrated clearly by the results for Comparative Examples 12–15. An improvement in adhesion performance is demonstrated by the magnetic backing packages of Comparative Examples 6 and 7 containing intercalated smectite clay particles and polyurethane binder. However, the WER values for the magnetic backing packages of Comparative Examples 6 and 7 are unacceptable. Thus, it is readily apparent that neither a magnetic backing package containing a two-component conductive layer nor a magnetic backing package containing a three-component conductive layer not including metal-containing conductive particles can provide both adequate adhesion performance and acceptable WER values.

Although the comparisons cited hereinabove were based on equivalent weight percentages of zinc antimonate, clay particles (i.e., normal, intercalated or exfoliated), and polymeric binder, it is preferred to base comparisons on comparable volume percentages of zinc antimonate, clay particles, and polymeric binder because of the dependence of the density of the clay on the extent of polymer intercalation and the possible presence of "excess" intercalating polymer in the conductive layer. A comparison of the WER, dry adhesion, and wet adhesion performance for the magnetic backing packages of Example 1 containing about 19 volume percent zinc antimonate and about 9 volume percent polymer-intercalated clay particles with those for the magnetic backing packages of Comparative Example 1 containing 21 volume percent of zinc antimonate and 15 volume percent normal clay particles reveals that although the WER values are nearly identical and the dry adhesion is excellent for both, the wet adhesion of the magnetic backing packages of Example 1 is superior to that of Comparative Example 1. Similarly, the magnetic backing package of Example 6 containing about 18 volume percent zinc antimonate and about 7 volume percent polymer-exfoliated clay exhibited a comparable WER value and excellent dry adhesion, but had superior wet adhesion to that of Comparative Example 1. The magnetic backing package of Comparative Example 9 not containing clay exhibited similar WER, dry adhesion, and wet adhesion values but contained nearly 30 percent more zinc antimonate (by weight) than the conductive layer of Example 1. This higher weight percentage of zinc antimonate in the conductive layer produces higher optical density and scattering losses for the magnetic backing package. For magnetic backing packages containing lower volume percentages of zinc antimonate such as Example 3 containing about 11 volume percent zinc antimonate and Comparative Example 3 containing about 13 volume percent zinc antimonate, which exhibited similar WER values, both dry and wet adhesion performance was clearly superior for the magnetic backing packages of Example 3 relative to that for those of Comparative Example 3. Although the WER value and the dry and wet adhesion performance for the magnetic backing package of Comparative Example 11 containing about 15 volume percent zinc antimonate were comparable to those of Example 3a, the conductive layer of Comparative Example 11 contained 25 percent (by weight) more zinc antimonate and thus exhibited a substantially higher $\Delta UV\ D_{min}$ value.

Thus, the Example magnetic backing packages described hereinabove illustrate a key teaching of this invention, namely, that the inclusion of a four component electrically-conductive layer including electrically-conductive metal-containing particles (e.g., zinc antimonate), swellable smectite clay particles (e.g., Laponite RDS), a polymer which can sufficiently intercalate in and/or exfoliate the clay particles (e.g., AQ-55 polyesterionomer), and a film-forming polymeric binder (e.g., Witcobond W-236) in a magnetic backing package provides comparable or improved WER values and superior dry and wet adhesion performance at lower volume percentages of both conductive metal-containing particles and/or clay particles relative to magnetic backing packages of prior art.

TABLE 1

Conductive magnetic backing packages containing polymer-intercalated smectite clay particles

| Sample | Dry Cover (g/m²) | Wt % ZnA | Vol % ZnA | Clay Treatmt | Wt % Clay | Vol % Clay | Wt % Excess AQ-55 | Vol % Excess AQ-55 | Wt % Binder | Vol % Binder | $\Delta UV\ D_{min}$ | $\Delta Ortho\ D_{min}$ | WER log (Ω/sq) | Dry Adhesion | Wet Adhesion |
|---|---|---|---|---|---|---|---|---|---|---|---|---|---|---|---|
| Example 1a | 1.0 | 55 | 18.7 | interc | 8.3 | 9.1 | 6.7 | 13.2 | 30 | 59 | 0.206 | 0.069 | 9.1 | excellent | excellent |
| Example 1b | 0.6 | 55 | 18.7 | interc | 8.3 | 9.1 | 6.7 | 13.2 | 30 | 59 | 0.195 | 0.066 | 9.5 | excellent | very good |
| Comp. Ex. 1a | 1.0 | 55 | 21 | normal | 15 | 15 | 0 | 0 | 30 | 64 | 0.208 | 0.071 | 8.9 | excellent | good |
| Comp. Ex. 1b | 0.6 | 55 | 21 | normal | 15 | 15 | 0 | 0 | 30 | 64 | 0.191 | 0.069 | 9.3 | fair | good |
| Example 2a | 1.0 | 70 | 32.5 | interc | 11.1 | 16.6 | 8.9 | 24.0 | 10 | 26.9 | 0.210 | 0.071 | 8.4 | excellent | fair |

TABLE 1-continued

Conductive magnetic backing packages containing polymer-intercalated smectite clay particles

| Sample | Dry Cover (g/m²) | Wt % ZnA | Vol % ZnA | Clay Treatmt | Wt % Clay | Vol % Clay | Wt % Excess AQ-55 | Vol % Excess AQ-55 | Wt % Binder | Vol % Binder | ΔUV D_min | ΔOrtho D_min | WER log (Ω/sq) | Dry Adhesion | Wet Adhesion |
|---|---|---|---|---|---|---|---|---|---|---|---|---|---|---|---|
| Example 2b | 0.6 | 70 | 32.5 | interc | 11.1 | 16.6 | 8.9 | 24.0 | 10 | 26.9 | 0.197 | 0.068 | 8.8 | excellent | fair |
| Example 2c | 0.3 | 70 | 32.5 | interc | 11.1 | 16.6 | 8.9 | 24.0 | 10 | 26.9 | 0.192 | 0.066 | 10.2 | excellent | good |
| Comp. Ex. 2a | 1.0 | 70 | 39.3 | normal | 20 | 29.6 | 0 | 0 | 10 | 31.1 | 0.205 | 0.070 | 8.1 | poor | poor |
| Comp. Ex. 2b | 0.6 | 70 | 39.3 | normal | 20 | 29.6 | 0 | 0 | 10 | 31.1 | 0.198 | 0.068 | 8.4 | poor | poor |
| Comp. Ex. 2c | 0.3 | 70 | 39.3 | normal | 20 | 29.6 | 0 | 0 | 10 | 31.1 | 0.190 | 0.066 | 9.3 | fair | poor |
| Example 3a | 1.0 | 40 | 11.2 | interc | 11.1 | 9.9 | 8.9 | 14.4 | 40 | 64.5 | 0.203 | 0.068 | 10.3 | excellent | very good |
| Example 3b | 0.6 | 40 | 11.2 | interc | 11.1 | 9.9 | 8.9 | 14.4 | 40 | 64.5 | 0.195 | 0.068 | 10.9 | excellent | very good |
| Comp. Ex. 3a | 1.0 | 40 | 13 | normal | 20 | 17 | 0 | 0 | 40 | 70 | 0.203 | 0.071 | 9.9 | good | good |
| Comp. Ex. 3b | 0.6 | 40 | 13 | normal | 20 | 17 | 0 | 0 | 40 | 70 | 0.195 | 0.068 | 10.5 | poor | good |
| Example 4a | 1.0 | 45 | 13.6 | interc | 13.9 | 14.2 | 11.1 | 19.5 | 30 | 52.7 | 0.204 | 0.067 | 9.7 | excellent | good |
| Example 4b | 0.6 | 45 | 13.6 | interc | 13.9 | 14.2 | 11.1 | 19.5 | 30 | 52.7 | 0.192 | 0.066 | 10.1 | excellent | fair |
| Comp. Ex. 4a | 1.0 | 45 | 15.8 | normal | 25 | 23.1 | 0 | 0 | 30 | 61.1 | 0.201 | 0.070 | 9.1 | very poor | poor |
| Comp. Ex. 4b | 0.6 | 45 | 15.8 | normal | 25 | 23.1 | 0 | 0 | 30 | 61.1 | 0.192 | 0.067 | 9.5 | fair | poor |
| Example 5a | 1.0 | 50 | 16.7 | interc | 16.6 | 18.7 | 13.4 | 25.9 | 20 | 38.7 | 0.205 | 0.069 | 9.5 | good | poor |
| Example 5b | 0.6 | 50 | 16.7 | interc | 16.6 | 18.7 | 13.4 | 25.9 | 20 | 38.7 | 0.194 | 0.066 | 9.9 | good | good |
| Comp. Ex. 5a | 1.0 | 50 | 19.1 | normal | 30 | 36.8 | 0 | 0 | 20 | 44.1 | 0.201 | 0.070 | 8.7 | very poor | very poor |
| Comp. Ex. 5b | 0.6 | 50 | 19.1 | normal | 30 | 36.8 | 0 | 0 | 20 | 44.1 | 0.194 | 0.067 | 9.1 | very poor | very poor |
| Comp. Ex. 6 | 1.0 | 0 | 0 | interc | 38.8 | 26 | 31.2 | 37.6 | 30 | 36.4 | 0.179 | 0.063 | 12.5 | excellent | very poor |
| Comp. Ex. 7 | 1.0 | 0 | 0 | interc | 50 | 35.7 | 40 | 51.5 | 10 | 12.8 | 0.183 | 0.063 | >12.5 | fair | very poor |

TABLE 2

Conductive magnetic backing packages containing polymer-exfoliated smectite clay particles

| Sample | Dry Coverage (g/m²) | Wt % ZnA | Vol % ZnA | Clay Treatment | Wt % Clay | Vol % Clay | Wt % AQ-55 | Wt % Binder | Vol % Binder | ΔUV D_min | ΔOrtho D_min | WER log (Ω/sq) | Dry Adhesion | Wet Adhesion |
|---|---|---|---|---|---|---|---|---|---|---|---|---|---|---|
| Example 6a | 1.0 | 55 | N/C | exfoliated | 4.5 | N/C | 10.5 | 30 | N/C | 0.206 | 0.070 | 9.4 | excellent | excellent |
| Example 6b | 0.6 | 55 | N/C | exfoliated | 4.5 | N/C | 10.5 | 30 | N/C | 0.196 | 0.067 | 9.8 | excellent | excellent |
| Comp. Ex. 1a | 1.0 | 55 | 21 | normal | 15 | 15 | 0 | 30 | 64 | 0.208 | 0.071 | 8.9 | excellent | good |
| Comp. Ex. 1b | 0.6 | 55 | 21 | normal | 15 | 15 | 0 | 30 | 64 | 0.191 | 0.069 | 9.3 | fair | good |
| Example 7 | 1.0 | 40 | N/C | exfoliated | 6 | N/C | 14 | 40 | N/C | 0.203 | 0.069 | 11.2 | excellent | excellent |
| Comp. Ex. 3a | 1.0 | 40 | 13 | normal | 20 | 17 | 0 | 40 | 70 | 0.203 | 0.071 | 9.9 | good | good |
| Example 8 | 1.0 | 45 | N/C | exfoliated | 7.5 | N/C | 17.5 | 30 | N/C | 0.205 | 0.070 | 10.4 | excellent | excellent |
| Comp. Ex. 4a | 1.0 | 45 | 16 | normal | 25 | 24 | 0 | 30 | 64 | 0.201 | 0.070 | 9.1 | very poor | poor |
| Example 9 | 1.0 | 50 | N/C | exfoliated | 9 | N/C | 21 | 20 | N/C | 0.207 | 0.071 | 9.7 | excellent | good |
| Comp. Ex. 5a | 1.0 | 50 | 19.1 | normal | 30 | 36.8 | 0 | 20 | 44.1 | 0.201 | 0.070 | 8.7 | very poor | very poor |
| Comp. Ex. 8 | 1.0 | 80 | 42 | no clay | 0 | 0 | 0 | 20 | 58 | 0.221 | 0.073 | 8.2 | excellent | excellent |
| Comp. Ex. 9 | 1.0 | 70 | 30 | no clay | 0 | 0 | 0 | 30 | 70 | 0.217 | 0.075 | 8.9 | excellent | excellent |
| Comp. Ex. 10 | 1.0 | 60 | 21 | no clay | 0 | 0 | 0 | 40 | 79 | 0.224 | 0.074 | 9.6 | excellent | excellent |
| Comp. Ex. | 1.0 | 50 | 15 | no clay | 0 | 0 | 0 | 50 | 85 | 0.217 | 0.077 | 10.6 | excellent | excellent |

TABLE 2-continued

Conductive magnetic backing packages containing polymer-exfoliated smectite clay particles

| Sample | Dry Coverage (g/m²) | Wt % ZnA | Vol % ZnA | Clay Treatment | Wt % Clay | Vol % Clay | Wt % AQ-55 | Wt % Binder | Vol % Binder | ΔUV $D_{min}$ | ΔOrtho $D_{min}$ | WER log (Ω/sq) | Dry Adhesion | Wet Adhesion |
|---|---|---|---|---|---|---|---|---|---|---|---|---|---|---|
| 11 Comp. Ex. 12 | 1.0 | 0 | 0 | normal | 60 | 40.5 | 0 | 40 | 59.5 | 0.163 | 0.060 | >12.5 | very poor | very poor |
| Comp. Ex. 13 | 1.0 | 0 | 0 | normal | 70 | 51.5 | 0 | 30 | 48.5 | 0.161 | 0.061 | >12.5 | very poor | very poor |
| Comp. Ex. 14 | 1.0 | 0 | 0 | normal | 80 | 64.5 | 0 | 20 | 35.5 | 0.165 | 0.060 | 9.4 | very poor | very poor |
| Comp. Ex. 15 | 1.0 | 0 | 0 | normal | 90 | 80.3 | 0 | 10 | 19.7 | 0.166 | 0.058 | 9.9 | very poor | very poor |

ZnA = zinc antimonate
N/C = not calculated

The invention has been described in detail with particular reference to certain preferred embodiments thereof, but it will be understood that variations and modifications can be effected within the spirit and scope of the invention.

What is claimed is:

1. An imaging element comprising:
   a support;
   an image-forming layer superposed on said support;
   a transparent magnetic recording layer comprising magnetic particles dispersed in a first film-forming polymeric binder superposed on said support; and
   an electrically-conductive layer superposed on said support; said electrically-conductive layer comprising:
   (1) semiconductive colloidal metal oxide containing particles;
   (2) swellable, smectite clay particles;
   (3) a first polymeric binder which can sufficiently intercalate inside or exfoliate the smectite clay particles; and
   (4) a second film-forming polymeric binder, wherein the electrically-conductive metal-containing particles and the polymer-intercalated or polymer-exfoliated smectite clay particles are dispersed.

2. The imaging element of claim 1, wherein the semiconductive colloidal metal oxide containing particles comprise from about 10 to 40 percent by volume of said electrically-conductive layer.

3. The imaging element of claim 1, wherein the swellable, smectite clay particles comprise from 5 to 25 percent by a volume of said electrically-conductive layer.

4. The imaging element of claim 1, wherein the first polymeric binder comprises from 50 to 85 percent by a volume of said electrically-conductive layer.

5. The imaging element of claim 1, wherein the electrically-conductive layer has a total dry weight coverage of from about 0.01 to about 2 g/m².

6. The imaging element of claim 1, wherein the average primary particle size of the semiconductive colloidal metal oxide containing particles is 0.005 μm to 0.05 μm.

7. The imaging element of claim 1, wherein said semiconductive colloidal metal oxide containing particles are selected from the group consisting of semiconductive metal oxides, heteroatom donor-doped metal oxides, metal oxides containing oxygen deficiencies, metal carbides, metal nitrides, metal silicides, and metal borides.

8. The imaging element of claim 1, wherein said semiconductive colloidal metal oxide containing particles are selected from the group consisting of tin oxide, antimony-doped tin oxide, niobium-doped tin oxide, fluorine-doped tin oxide, indium sesquioxide, tin-doped indium sesquioxide, zinc oxide, aluminum-doped zinc oxide, indium-doped zinc oxide, titanium dioxide, niobium-doped titanium dioxide, tantalum-doped titanium dioxide, zinc antimonate, indium antimonate, molybdenum trioxide, tungsten trioxide, vanadium pentoxide, and silver-doped vanadium pentoxide.

9. The imaging element of claim 1, wherein said swellable, smectite clay particles are selected from the group consisting of kaolin, bentonite, montmorillonite, beiderite, saponite, hectorite, synthetic hectorite, and layered hydrous magnesium silicate.

10. The imaging element of claim 1, wherein the basal (001) spacing of said swellable, smectite clay particles increases by at least 50 percent when the weight ratio of smectite clay particles to the first polymeric binder which can sufficiently intercalate inside or exfoliate the smectite clay particles is changed from 100:0 to 30:70.

11. The imaging element of claim 1, wherein said first polymeric binder which can sufficiently intercalate inside or exfoliate the smectite clay particles is selected from the group consisting of poly(vinyl alcohol), poly(ethylene oxide), poly(acrylamide), poly(styrene sulfonate), hydrophilic colloids, polymers of styrene, polymers of styrene derivatives, interpolymers of styrene, interpolymers of styrene derivatives, sulfonated styrene/maleic anhydride copolymers, alkyl acrylates, alkyl methacrylates, derivatives of alkyl acrylates, derivatives of alkyl methacrylates, olefins, acrylonitriles, poly(urethane)s, and poly(esterionomers).

12. The imaging element of claim 1 wherein said second film-forming polymeric binder is a water-dispersible polyurethane.

13. The imaging element of claim 1, wherein said support is selected from the group consisting of poly(ethylene terephthalate), poly(ethylene naphthalate), and cellulose acetate films.

14. The imaging element of claim 1, wherein said magnetic particles comprise cobalt surface modified γ-iron oxide particles or magnetite particles.

15. The imaging element of claim 1, wherein the cobalt surface-modified γ-iron oxide particles or magnetite particles comprise a dry weight coverage of from 10 mg/m² to 1000 mg/m².

16. The imaging element of claim 1, wherein the first film-forming polymeric binder comprises cellulose acetate or polyurethane.

17. A photographic film comprising:
   a support;
   a silver halide emulsion layer superposed on a first side of said support;

an electrically-conductive layer superposed on a second side of said support, said electrically-conductive layer comprising:
(1) semiconductive colloidal metal oxide containing particles;
(2) swellable, smectite clay particles;
(3) a polymeric binder which can intercalate inside or exfoliate the smectite clay particles;
(4) a first film-forming polymeric binder, wherein the semiconductive colloidal metal oxide containing particles and the polymer-intercalated or polymer-exfoliated smectite clay particles are dispersed; and a transparent magnetic recording layer overlying said electrically-conductive layer comprising ferromagnetic particles dispersed in a second film-forming binder.

18. A thermally-processable imaging element comprising:

a support;

an image-forming layer superposed on a first side of said support;

an electrically-conductive layer superposed on a second side of said support, said electrically-conductive layer comprising:
(1) semiconductive colloidal metal oxide containing particles;
(2) swellable, smectite clay particles;
(3) a polymeric binder which can sufficiently intercalate inside and/or exfoliate the smectite clay particles;
(4) a first film-forming polymeric binder, wherein the semiconductive colloidal metal oxide containing particles and the polymer-intercalated or polymer-exfoliated smectite clay particles are dispersed; and a transparent magnetic recording layer overlying said electrically-conductive layer comprising ferromagnetic particles dispersed in a second film-forming binder.

19. A photographic film comprising:

a support;

a silver halide emulsion layer superposed on a first side of said support;

an electrically-conductive layer superposed on a second side of said support, said electrically-conductive layer comprising:
(1) electrically-conductive metal antimonate colloidal particles;
(2) swellable, smectite clay particles;
(3) a polymeric binder which can sufficiently intercalate inside and/or exfoliate the smectite clay particles;
(4) a first film-forming polymeric binder, wherein the electrically-conductive metal antimonate particles and the polymer-intercalated or polymer-exfoliated smectite clay particles are dispersed; and a transparent magnetic recording layer overlying said electrically-conductive layer comprising ferromagnetic particles dispersed in a second film-forming binder.

20. A thermally-processable imaging element comprising:

a support;

an image-forming layer superposed on a first side of said support;

an electrically-conductive layer superposed on a second side of said support, said electrically-conductive layer comprising:
(1) electrically-conductive metal antimonate colloidal particles;
(2) swellable, smectite clay particles;
(3) a polymeric binder which can sufficiently intercalate inside and/or exfoliate the smectite clay particles;
(4) a first film-forming polymeric binder, wherein the electrically-conductive metal antimonate particles and the polymer-intercalated or polymer-exfoliated smectite clay particles are dispersed; and a transparent magnetic recording layer overlying said electrically-conductive layer comprising ferromagnetic particles dispersed in a second film-forming binder.

* * * * *